(12) United States Patent
Guezelarslan

(10) Patent No.: US 11,391,808 B2
(45) Date of Patent: Jul. 19, 2022

(54) METHOD FOR DIRECTION FINDING OF AT LEAST ONE STATIONARY AND/OR MOVING TRANSMITTER AS WELL AS SYSTEM FOR DIRECTION FINDING

(71) Applicant: Rohde & Schwarz GmbH & Co. KG, Munich (DE)

(72) Inventor: Baris Guezelarslan, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 764 days.

(21) Appl. No.: 16/384,597

(22) Filed: Apr. 15, 2019

(65) Prior Publication Data

US 2019/0346532 A1 Nov. 14, 2019

(30) Foreign Application Priority Data

May 8, 2018 (EP) ..................................... 18171233

(51) Int. Cl.
*G01S 3/32* (2006.01)
*G06F 16/904* (2019.01)
*G06N 3/04* (2006.01)
*H04W 4/02* (2018.01)
*G06N 20/00* (2019.01)
*G01S 5/02* (2010.01)

(52) U.S. Cl.
CPC ............ *G01S 3/325* (2013.01); *G06F 16/904* (2019.01); *G06N 3/0418* (2013.01); *H04W 4/026* (2013.01); *G01S 5/02* (2013.01); *G06N 20/00* (2019.01)

(58) Field of Classification Search
CPC ........ G06N 3/0454; G06N 20/00; G06N 3/02; G06F 2221/2111; G06F 30/27; G01S 5/02; G01S 15/06; G01S 5/04; G01S 7/417; G01S 5/14; G01S 13/04; G01S 5/0278; G01S 5/0289; G01S 7/412; G01S 3/325; G01S 5/021; G01S 13/66
See application file for complete search history.

(56) References Cited

U.S. PATENT DOCUMENTS

| 5,276,770 | A | | 1/1994 | Castelaz |
| 5,548,512 | A | * | 8/1996 | Quraishi ............... G05D 1/0221 706/905 |
| 5,768,477 | A | | 6/1998 | Johnson et al. |
| 6,351,711 | B1 | * | 2/2002 | Chansarkar ............. G01S 19/42 701/481 |
| 10,271,179 | B1 | * | 4/2019 | Shima .................... G01S 5/0278 |
| 11,079,497 | B2 | * | 8/2021 | Li .......................... G07C 5/008 |

(Continued)

*Primary Examiner* — Olumide Ajibade Akonai
(74) *Attorney, Agent, or Firm* — Christensen O'Connor Johnson Kindness PLLC

(57) ABSTRACT

A method for direction finding of at least one stationary and/or moving transmitter comprises the following steps: measuring the signals emitted by each of the at least one transmitter at at least two different measurement points; determining the location of the measurements points at the time of the measurement; determining the bearings from the measurement points to each of the at least one transmitter; transferring the bearings to a pre-trained artificial neural network; and estimating the locations of the at least one transmitter by the artificial neural network. Further, a system for direction finding of at least one stationary and/or moving transmitter is shown.

20 Claims, 4 Drawing Sheets

(56) References Cited

U.S. PATENT DOCUMENTS

| | | |
|---|---|---|
| 2013/0229310 A1 | 9/2013 | Parks et al. |
| 2014/0159954 A1* | 6/2014 | Stoddard .................. G01S 3/023 342/359 |
| 2014/0218240 A1* | 8/2014 | Kpodzo .................. G01S 3/043 342/450 |
| 2018/0003588 A1* | 1/2018 | Iwanami .................. G06N 5/04 |
| 2018/0014151 A1* | 1/2018 | Kratz ...................... H04L 67/20 |
| 2019/0248411 A1* | 8/2019 | Peng ...................... G06N 3/084 |

* cited by examiner

METHOD FOR DIRECTION FINDING OF AT LEAST ONE STATIONARY AND/OR MOVING TRANSMITTER AS WELL AS SYSTEM FOR DIRECTION FINDING

FIELD OF THE DISCLOSURE

The disclosure relates to a method for direction finding of at least one stationary and/or moving transmitter as well as a system for direction finding of at least one stationary and/or moving transmitter.

BACKGROUND

Direction finding of transmitters is a common task, for example for locating a source of noise or locating any other transmitting devices.

During direction finding, usually the signals of the transmitters to be located are received and measured at different measurement points. Based on the measurement, bearings from the measurement points to the transmitters are calculated. Calculating bearings is per se known.

The difficulty arises because the location of the transmitters has to be estimated based on the bearings alone. However, in many situations so-called ghost locations occur that, judged from the received signals alone, closely resemble a transmitter even though no transmitter is present at these locations.

The ghost locations pose a serious problem for automated direction finding so that a graphical representation of the bearings is usually outputted to the operator. The operator himself then estimates the location of the transmitters based on the graphical representation.

SUMMARY

Thus, there is a need to provide a method for direction finding and a system for direction finding that allow an automated and resource efficient way for locating a transmitter.

For this purpose or others, a method for direction finding of at least one stationary and/or moving transmitter is provided. In some embodiments, the direction finding method comprises the following steps:
a) measuring the signals emitted by each of the at least one transmitter at at least two different measurement points;
b) determining the location of the measurements points at the time of the measurement;
c) determining the bearings from the measurement points to each of the at least one transmitter;
d) creating a graphical representation of the bearings;
e) transferring the graphical representation as the bearings or in addition to the bearings to a pre-trained artificial neural network; and
f) estimating the locations of the at least one transmitter by the artificial neural network.

In the following, the word "transmitter" is used for any source of electromagnetic radiation, especially in radio frequencies. Thus, the term "transmitter" includes sources and emitters as well.

The disclosure is based on the idea that the complex matter of direction finding can be broken down into two problems that can be handled separately in a very efficient way.

Firstly, calculating the bearings is very well known and can be done with usual computing devices, such as sufficiently programmed microprocessors.

Artificial neural networks are a very efficient tool for analyzing graphical input and for recognizing patterns in graphical input. Thus, creating the graphical representation of the bearings and using the graphical representation as the sole or additional input for the artificial neural network leads to further improvements in terms of the efficiency of and resources needed for the artificial neural network.

In other words, it has been realized that the problem of estimating the locations can be turned into a graphical problem that can efficiently be solved by an artificial neural network, even if ghost locations are present.

It has been realized that for the next step—estimating the location based on the bearings—an artificial neural network can be used that is trained to this specific problem. Such a specialized artificial network can be realized for this step much more cost-efficiently than for the whole problem of direction finding.

Thus, in total a very resource efficient and fully automated method and system for direction finding can be realized.

The location of the measurement point at the time of the measurement is saved, may be determined from a memory as it is not always necessary to determine the location for each measurement anew, for example when the measurements points are stationary In some embodiments, pre-training of the artificial neural network is performed using a test data set, wherein the test data set comprises sets of bearings and/or graphical representations of bearings and information about the correct location of the at least one transmitter for each set of bearings and/or graphical representation. This way, an efficient artificial neural network specialized for this task is realized.

For example, the test data set includes sets of bearings and/or graphical representations having ghost locations. The correct location may be labelled in the graphical representations.

In an embodiment of the disclosure, the locations of the measurement points are determined relative to each other and/or absolute, for example using a receiver for a satellite based location system, and/or that the locations of the at least one transmitter are estimated relative to each of the measurement points and/or absolute. The precision of the estimation is improved that way.

For a precise calculation, the bearings are determined, for example, using the direction of signals at the measurement points and/or using the location of the measurement points and/or that the bearings are determined in two and/or three dimensions.

The bearings may very efficiently be determined using an algorithm for calculating bearings, for example based on the super resolution technique, the Watson-Watt technique and/or the running-fix technique.

In order to provide reliable measurement data, the signals may be measured in some embodiments using at least two stationary antennas located at the measurement points and/or at least one movable antenna. The moveable antenna may be moved between measurement points.

For example, each antenna may be part of a direction finding unit.

In another embodiment of the disclosure, the artificial neural network is a convolutional neural network, a recurrent neural network, a capsule neural network or any combination thereof. These types of artificial neural networks are very efficient for the task of estimating the location based on the calculated bearings.

In order to track moving transmitter, at least the step a) is repeated again at another point in time, wherein a track covered by one or more of the antennas is determined and/or a track covered by one or more of the at least one transmitter is estimated. Of course, one or more of steps b) to e) may also be repeated.

For the ease of use, the operator is provided with the bearings, the graphical representation of the bearings, the estimated locations of the at least one transmitter and/or a map, wherein the map may include the estimated location of the at least one transmitter, the location of the measurement points, geospatial data, the graphical representation of the bearings, the track covered by one or more of the antennas and/or the track covered by one or more of the at least one transmitter. The graphical representation may be laid out over the map.

For the above-mentioned purpose, a system for direction finding of at least one stationary and/or moving transmitter is also provided. In some embodiments, the direction finding system comprises at least two stationary direction finding units with an antenna each and/or at least one movable direction finding unit with an antenna, a bearing module for determining the bearings from the antenna to each of the at least one transmitter, and a pre-trained artificial neural network for estimating the locations of the at least one transmitter based on the determined bearings. The system in some embodiments is configured to perform the method as described above.

It is also conceivable that each direction finding unit may be provided with a bearing module. The bearing module may be implanted in software or hardware or a combination of software and hardware. In an embodiment, each bearing module is implemented with a special purpose microprocessor.

The relative location of direction finding modules may be determined by the location modules themselves.

It is also possible that the absolute location is passed to the system from an external source or the direction finding units comprise a receiver for a satellite based location system.

In another aspect, the system comprises a control unit having the artificial neural network and/or the bearing module.

In one embodiment of the disclosure, the system comprises a display unit for providing the operator with the bearings, a graphical representation of the bearings, the estimated locations of the at least one transmitter and/or a map, wherein the map may include the estimated location of the at least one transmitter, the location of the measurement points, geospatial data, the graphical representation of the bearings, the track covered by one or more of the antennas and/or the track covered by one or more of the at least one transmitter. This simplifies the use of the system.

For example, the artificial neural network is a convolutional neural network, a recurrent neural network, a capsule neural network or any combination thereof.

The features mentioned for the method are to be seen as features of the system as well and vice versa. In some embodiments, the system is configured to perform any one of the methods according to claims 1-13.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1A:
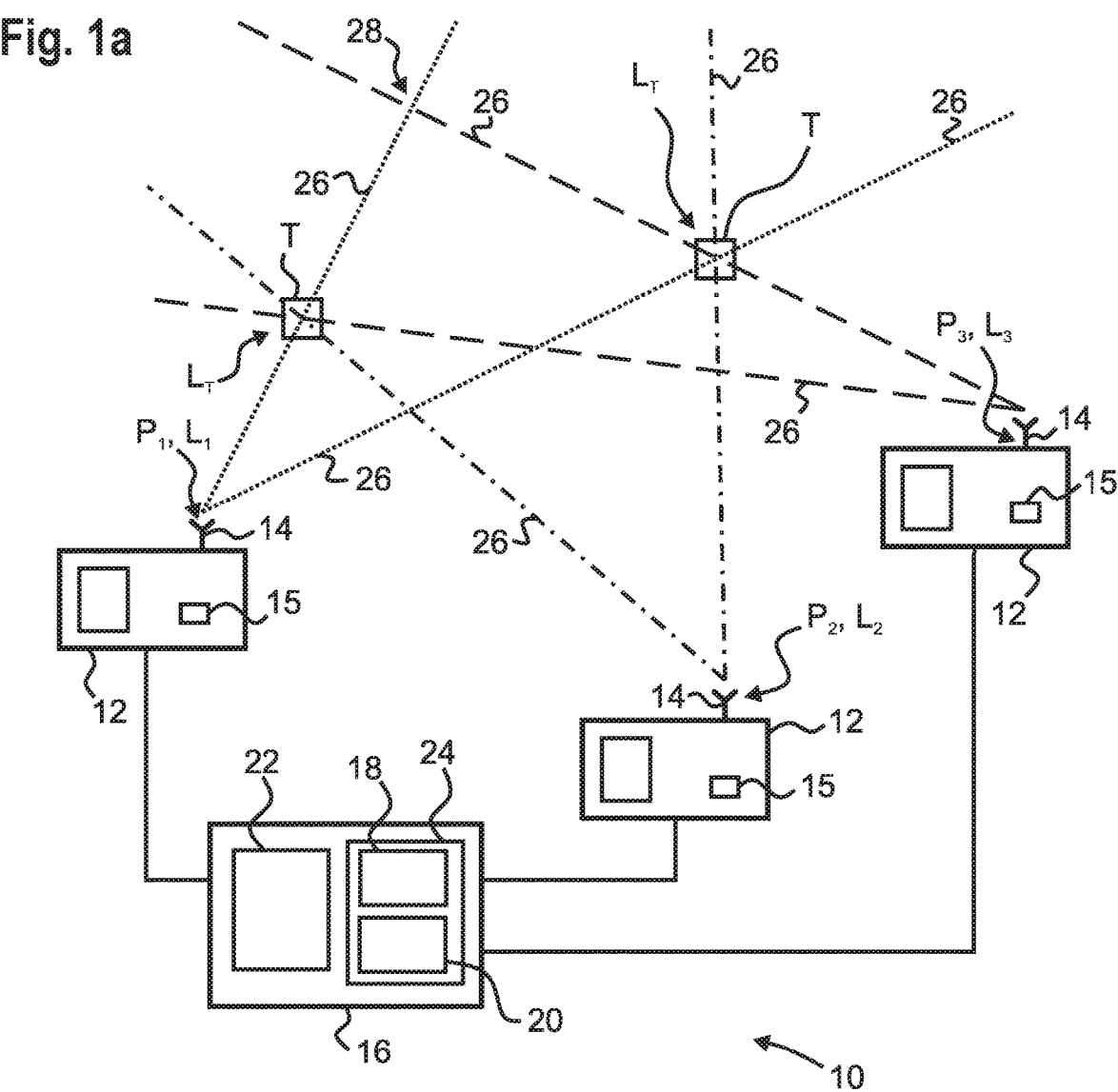
FIG. 1a schematically shows a first embodiment of a system according to the disclosure.

FIG. 1a shows a first embodiment of a system for direction finding of at least one stationary and/or moving transmitter. In the first embodiment, the system comprises three direction finding units 12 that each have an antenna 14. Each direction finding unit 12 is also equipped with a receiver 15 of a satellite based location system, like, for example, GPS, Galileo, GLONASS or Beidou.

In this embodiment, the direction finding unit 12 and with that the antennas 14 are stationary, i.e. they are not moved during the direction finding process. Of course, the direction finding unit 12 may be mobile in the sense that they can be deployed in different locations for direction finding.

The system 10 further includes a control device 16 comprising a bearing module 18, an artificial neural network 20 and a display unit 22. The bearing module 18 and the artificial neural network 20 may be implemented as either separate modules or a single hardware module, or the bearing module 18 and the artificial neural network 20 can be software modules that are executed by a single hardware module.

In the first embodiment shown in FIG. 1a, the control device 16 is provided as a device separate from the direction finding units 12. In this embodiment, the control device 16 comprises a control unit 24 that includes the bearing module 18 and the artificial neural network 20.

The control unit 24 is, for example, a computer system having a processor and a memory. The control unit 24 may also control the display unit 22 to provide information to the operator of the system 10. The control device 16, especially the control unit 24 is connected to the direction finding unit 12 for data transmission. This may be achieved by a cable connection or wirelessly via a known communications standard.

In some embodiments, the bearing module 18 comprises an algorithm that is able to calculate bearings 26 based on the signals received by the direction finding unit 12 and the antennas 14. The algorithm may be based on per se known techniques for calculating bearings, for example the super resolution technique, the Watson-Watt technique and/or the running-fix technique.

In some embodiments, the artificial neural network 20 may be a convolutional neural network, a recurrent neural network, a capsule neural network or any combination of the mentioned neural network types. In some embodiments, the artificial neural network 20 has been pre-trained so that it is configured to estimate the locations of transmitters based on a given set of bearings 26. One or more embodiments of the training process will be described in more detail below.

For direction finding, e.g., for determining the locations $L_T$ of the transmitters T, the direction finding units 12 are set up spaced apart from each other at different locations $L_1$, $L_2$, $L_3$. The locations $L_1$, $L_2$, $L_3$, more precisely the location of the antennas 14 define different measurement points $P_1$, $P_2$ and $P_3$. It is also possible that one direction finding unit 12 is used to which a plurality of antennas 14 are connected that are located at the different measurement points $P_1$, $P_2$ and $P_3$.

Once the direction finding units 12 have been set up in step S1 (see FIG. 1b), the absolute locations are determined with the receiver 15, and the locations $L_1$, $L_2$ and $L_3$ are provided to the control device 16, for example the control unit 24 (step S2). In other embodiments, it is also possible that the absolute location is supplied to the control unit 24 or the direction finding unit 12 by an external source, like an external receiver of a satellite based location system.

Of course, the first step S1 and possible also the second step S2 are not necessary if permanently fixed direction finding units 12 are used. Instead, the locations $L_1$, $L_2$ and $L_3$ of the measurement points $P_1$, $P_2$ and $P_3$ can be determined (e.g., obtained) from the memory.

In step S3, each of the direction finding units 12 measures the signals that are emitted from the transmitters T so that the measurements of the signals of the transmitters T are performed at the three measurement points $P_1$, $P_2$ and $P_3$. The measured signals are then transferred to the control unit 24, for example the bearing module 18.

In step S4, the bearing module calculates the bearings 26 from each of the direction finding units 12 to each of the transmitters T. In other words, the bearing module 18 calculates the bearings 26 from each of the measurement points $P_1$, $P_2$ and $P_3$ to each of the transmitters T.

The bearing module 18 or the control unit 24 may then create a graphical representation of the bearings in step S5. An exemplary graphical representation is shown in FIG. 1c and may comprise a picture or a bitmap in which the bearings 26 are drawn in the correct relative location and orientation to each other. To create this graphical representation, the locations $L_1$, $L_2$ and $L_3$ of the measurement points $P_1$, $P_2$ and $P_3$ are used.

In the next step S6, the graphical representation is transferred to the artificial neural network 20. The artificial neural network 20 estimates in step S7 the locations $L_T$ of the transmitters T based on the graphical representation. Because the graphical representation is used, the artificial neural network 20 may be designed for image recognition and does not need to process or take into account information about calculating bearings or wave propagation. Thus, the artificial neural network 20 can be very efficient and quick. In other words, the artificial neural network 20 receives the picture, e.g., the graphical representation, and marks the regions in the picture where the transmitters T are estimated to be.

The estimated location $L_T$ of the transmitters T may then be transformed into the absolute locations $L_T$ of the transmitters T. It is also conceivable, that only the relative location $L_T$ of the transmitters T with respect to the measurement points $P_1$, $P_2$, $P_3$ is estimated and used. It is of course possible that the artificial neural network 20 is able to process the bearings 26 without the need to provide the bearings as a graphical representation.

Figure 1B:
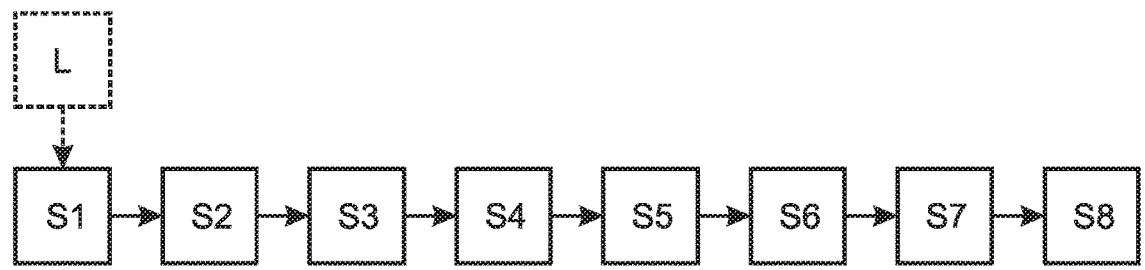
FIG. 1b shows a flowchart of a first embodiment of a method according to the disclosure.
Figure 1C:
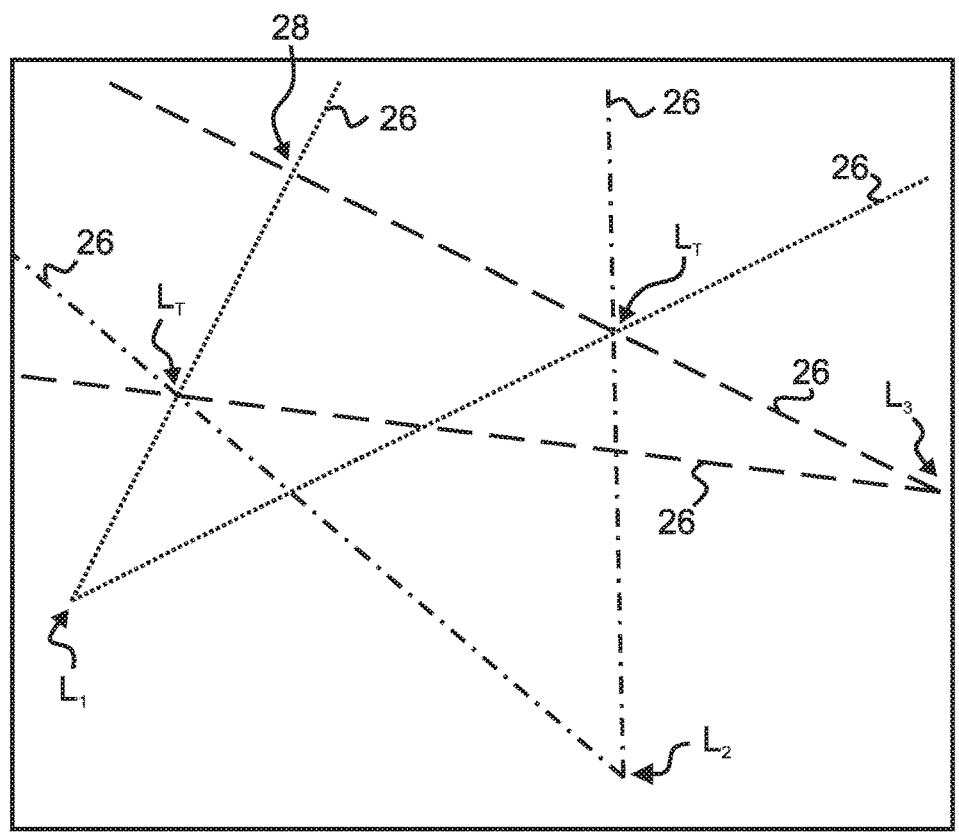
FIG. 1c shows a graphical representation of bearings calculated during the method of FIG. 1b.
Figure 1D:
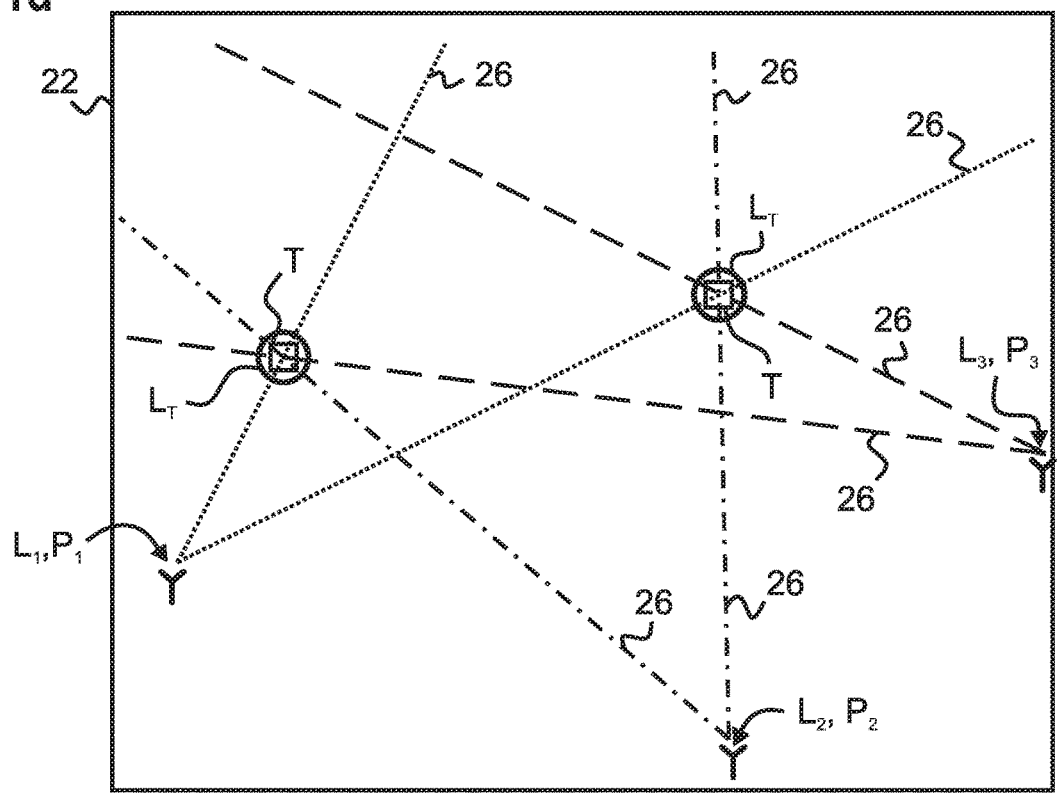
FIG. 1d shows the screen presented to an operator at the end of the method of FIG. 1b.

After the locations $L_T$ have been estimated, the control unit 24 controls the display unit 22 to display the graphical representation with the estimated locations of the transmitters $L_T$, as can be seen in FIG. 1d (step S8).

In FIG. 1d, the artificial neural network 20 has located the two transmitters T correctly as indicated by the circles. As can be seen, the point 28 in FIG. 1c, which is a so-called ghost location, at which another transmitter may be suspected, is correctly identified as such a ghost point without a transmitter T in FIG. 1d.

This graphical representation may be laid out over a map of the region around the transmitters T. The map may be enriched with geospatial information. Further, the measurement points $P_1$, $P_2$, $P_3$ may be also shown on the display unit 22 laid over the map.

Thus, a method for quickly estimating and visualizing the location of the transmitters T is realized. The method can be done in real-time because the algorithm to calculate the bearings and the artificial neural networks 20 are specialized for a specific task and can therefore be realized with high efficiency.

Before the artificial neural network 20 can be used for estimating the location of the transmitters T, it has to be trained. The training step or learning step A is performed before the method can be executed.

The training is done using a test data set. The test data set comprises different sets of bearings 26 and information about the location $L_T$ of the transmitters L. For example, the test data set consists of a plurality of graphical representations of the bearings 26 in which the location $L_T$ has already been highlighted or labelled. The sets of bearings 26 or the graphical representation may include ghost locations.

The bearings 26 or graphical representations of the test data set are then fed forward into the artificial neural network 20 and the results of the estimated locations are compared to the actual, known locations $L_T$ of the test data set.

The deviation or error in the location $L_T$ is then used to adjust the artificial neural network 20, for example by backward feeding the artificial neural network 20 with the error. In some embodiments, conventional learning methods for artificial neural networks 20 can be used.

After the artificial neural network 20 has been trained with a sufficient number of sets of test bearings 26 and/or test graphical representations, the artificial neural network 20 is then able to repeatedly estimate the locations $L_T$ of the transmitters T based on the bearings/the graphical representations alone. The artificial neural network is then pre-trained.

FIGS. 2a-2b and 3a-3b show further embodiments of the system and the method that correspond essentially to the first embodiment of FIGS. 1a-1d. Thus, only the differences are explained in the following, wherein same reference signs are used for identical or like parts.

Figure 2A:
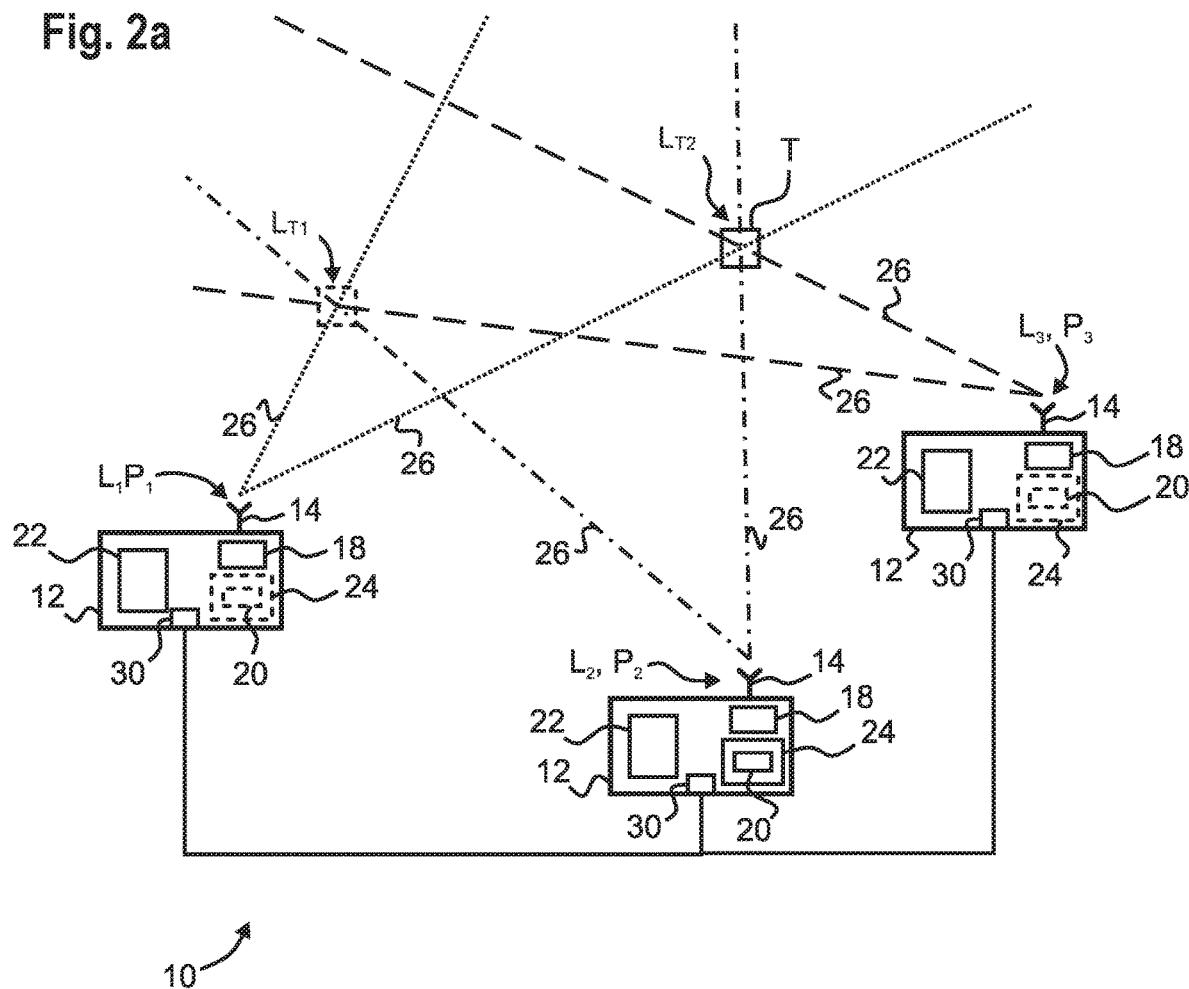
FIG. 2a shows a second embodiment of a system according to the disclosure, FIG. 2b schematically shows a flowchart of a second embodiment of a method according to the disclosure, FIG. 3a schematically shows a third embodiment of a system according to the disclosure.
Figure 2B:
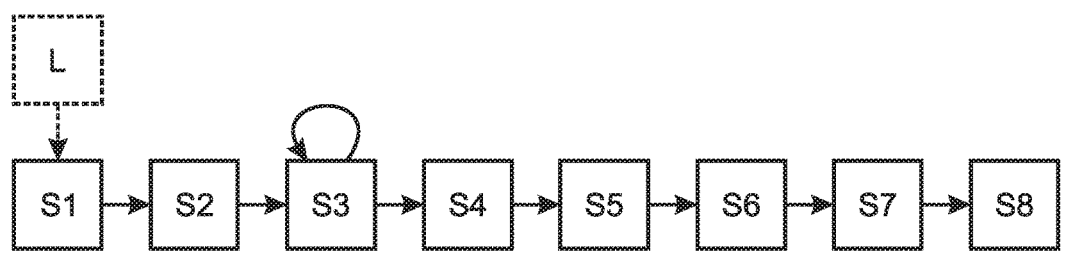

In the embodiments shown in FIGS. 2a and 2b, the control device 16 of the system 10 is not realized as a separate device. Instead, the control unit 24 and the display unit 22 are a part of one of the direction finding units 12.

It is also possible that all of the direction finding units 12 comprise a control unit 24 with an artificial neural network 20 and/or a bearing module 18 so that the system 10 can be controlled from any one of the direction finding units 12.

Further, each of the direction finding units 12 comprises its own bearing module 18 so that the control unit 24 does not need a bearing module anymore.

In some embodiments, the direction finding units 12 do not have a receiver 15 but a communication module 30. The communication modules 30 of each of the direction finding units 12 communicate with each other in order to determine the relative location $L_1$, $L_2$, $L_3$ with respect to each other. This information is sufficient to allow the estimation of the relative location $L_T$ of the transmitters T. The communication modules 30 include one or more circuits and can communicate with each other using any number of, for example, wired or wireless communications protocols.

In the situation shown in FIG. 2a, the system 10 is used to locate and track a moving transmitter T instead of a plurality of stationary transmitters as described before.

The method for this second situation differs from the method described with respect to FIGS. 1a-1d in that the signals of the transmitter T are measured at at least two different points in time, e.g., step S3 is repeated. For example, the signals of the transmitter T are measured at a first point in time for the first time. At this point in time, the transmitter T is located at location $L_{T1}$, indicated by the dashed square in FIG. 2a. At a second, later point in time, the measurements of the signals of the transmitter T are repeated. Now, the transmitter T is at a different location $L_{T2}$ indicated by the solid square in FIG. 2a.

For each of the measurements, the bearing modules 18 of the direction finding units 12 calculate the bearings 26 and transfer the bearings to the control unit 24. Of course, the bearings 26 are associated with the point in time at which the respective measurement was taken.

Using the artificial neural network 20, the estimated locations $L_{T1}$, $L_{T2}$ of the transmitter T are determined. The control unit 24 may then show the estimated locations LT1, $L_{T2}$ and track the transmitter T using the display unit 22 in addition to the visualization explained with respect to FIG. 1d.

Of course, more than two measurements of the signals of the transmitter T can be performed to achieve a finer and/or longer tracking of the location of the transmitter T.

The calculation of the bearings 26 and/or the estimation of the location of the transmitter T can be performed after each measurement or in lump after all measurements are completed.

It is also possible, that the position of the transmitter T is tracked in real-time when continuously repeating the method steps.

Figure 3A:
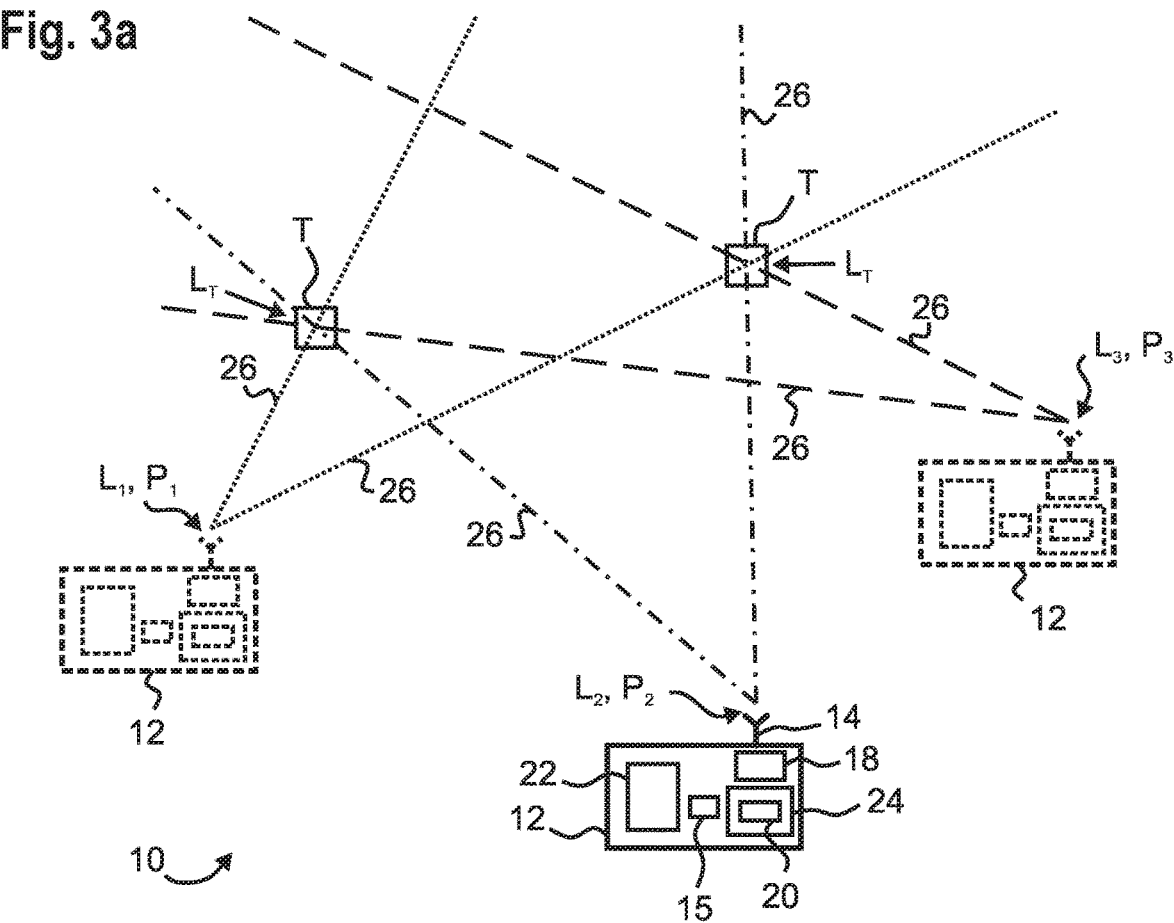
FIG. 3b shows a flowchart of a third embodiment of a method according to the disclosure.
Figure 3B:
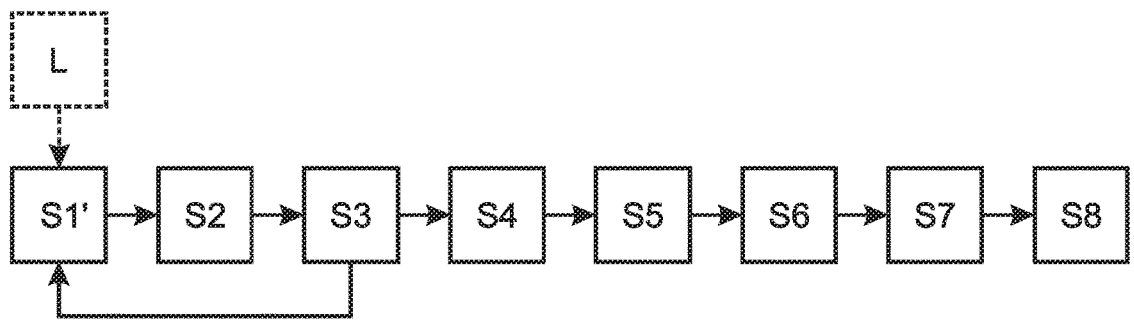

In a third embodiment shown in FIG. 3a, the system 10 comprises a single direction finding unit 12. In contrast to the embodiments described before, the direction finding unit 12 of this embodiment is moveable, meaning that the direction finding unit 12 is moved while the location of the transmitters T is determined. It is conceivable that only the antenna 14 is moved instead of the whole direction finding unit 12.

The direction finding unit 12 used in this third embodiment is similar to the once shown in the second embodiment of FIG. 2a, e.g., it comprises the bearing module 18, the artificial neural network 20 and the control unit 24. Of course, it is also possible that the control unit 24 is provided in a separate control device 16.

For locating the transmitters T, the direction finding unit 12 is deployed at a first measurement point $P_1$ (step S1'). At this first measurement point $P_1$ (indicated by the dashed lines in FIG. 3a) the location $L_1$ of the first measurement point $P_1$ is then determined using a receiver 15 for a satellite based location system (step S2).

As before, in step S3, the signals of the transmitters T are measured and received. Then, the direction finding unit 12 is redeployed to a second measurement point $P_2$, the location $L_2$ of this measurement point $P_2$ is determined and the signals of the transmitters T are measured once again. Thus, the steps S1', S2 and S3 are repeated. The three steps may be repeated a third time or even more often.

For each of the measurements, the bearings 26 are determined. As soon as the bearings 26 of the second measurement are determined, the bearings 26 or a graphical representation thereof can be fed to the artificial neural network 20 to estimate the locations $L_T$ of the transmitters T (steps S4 to S7).

Thus, it is possible to estimate the location of the transmitters T with a single direction finding unit 12.

The control unit 24 may output on the display unit 22 the track of the direction finding unit 12 in addition to the other information (step S8).

The three embodiments of the system 10 and the method shown above are merely examples. It is of course possible to combine the features of the shown embodiments in any given way. For example, one or more moving transmitters T may also be located using the system of the first embodiment.

For the sake of simplicity, the explanations and the FIGURES are restricted to two dimensions. Thus, the bearings 26 are calculated in two dimensions and the locations $L_T$ of the transmitters T are also estimated in two dimensions. The dimensions for the absolute location are the longitude and the latitude. Of course, the system and the method can be used to locate the transmitters T in three dimensions, i.e. adding the height to the longitude and the latitude. In this case, also the bearings 26 are calculated in three dimensions.

It will be understood that one or more of the components, such as the control device 16, the artificial neural network 20, the display unit 22, the control unit 24, and/or the communication modules 30, etc., described above, may include, in some embodiments, logic for implementing the technologies and methodologies described herein. This logic of one or more of these components can be carried out in either hardware or software, or a combination of hardware and software.

In an example, the functionality of one or more of these components could be implemented by special purpose hardware-based computer systems or circuits, etc., or combinations of special purpose hardware and computer instructions. In some embodiments, one or more of these components includes one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, one or more of these components include a microprocessor and a memory storing logic modules and/or instructions. In an embodiment, one or more of these components include one or more ASICs having a plurality of predefined logic components. In an embodiment, the one or more modules include one or more FPGA having a plurality of programmable logic components. In an embodiment, one or more of these components includes combinations of circuits and computer program products having software or firmware instructions stored on one or more computer readable memories that work together to cause a device to perform one or more methodologies or technologies described herein. In an embodiment, one or more of these components includes hardware circuits (e.g., implementations in analog circuitry, implementations in digital circuitry, and the like, and combinations thereof) for carrying out the functionality described herein.

It will be appreciated that one or more aspects of the methods set forth herein can be carried out, for example, in a computer-like system. In this regard, one or more program elements are provided, which are configured and arranged when executed on a computer or computing device, for direction finding of at least one of a stationary transmitter and a moving transmitter. In one embodiment, the one or more program elements may specifically be configured to perform one or more of the following steps: measuring said signals emitted by each of said at least one transmitter at at least two different measurement points; determining said location of said measurements points at said time of said measurement; determining said bearings from said measurement points to each of said at least one transmitter; creating a graphical representation of said bearings; transferring said graphical representation as said bearings or in addition to said bearings to a pre-trained artificial neural network; and estimating said locations of said at least one transmitter by said artificial neural network. In other embodiments, the one or more program elements may specifically be configured to perform one or more of the steps of claims 2-13.

The one or more program elements may be installed in memory, such as computer readable storage medium. The computer readable storage medium may be or included by any one of the computing devices, engines, modules, instruments, displays, units, etc., described elsewhere herein or another and separate computing device, engines, modules, instruments, displays, units, etc., as may be desirable. The computer readable storage medium and the one or more program elements, which may comprise computer-readable program code portions embodied therein, may further be contained within a non-transitory computer program product.

As mentioned, various embodiments of the present disclosure may be implemented in various ways, including as non-transitory computer program products, computer readable instructions, etc. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, optical disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. Other non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM) of any rate, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The computer-readable media include cooperating or interconnected computer-readable media, which exist exclusively on a processing system or distributed among multiple interconnected processing systems that may be local to, or remote from, the processing system.

As should be appreciated, various embodiments of the present disclosure may be also implemented as methods, apparatus, systems, computing devices, computing entities, computing engines, units, or modules, and/or the like, as have been described elsewhere herein or claimed below. As such, embodiments of the present disclosure may take the form of an apparatus, system, computing device, computing entity, computing engines, units, or modules and/or the like executing instructions stored on a computer-readable storage medium to perform certain steps or operations. However, embodiments of the present disclosure may also take the form of an entirely hardware embodiment performing certain steps or operations disclosed herein.

Various embodiments are described above with reference to block diagrams and/or flowchart illustrations of apparatuses, methods, systems, and computer program products. It should be understood that each block of any of the block diagrams and/or flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks and/or carry out the methods described herein.

These computer program instructions may also be stored in a computer-readable memory, such as the computer-readable storage media described above, that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, could be implemented by special purpose hardware-based computer systems or circuits, etc., that perform the specified functions or operations, or combinations of special purpose hardware and computer instructions.

According to some embodiments, many individual steps of a process may or may not be carried out utilizing the computer systems described herein, may be carried out in a different order including both serially and in parallel, and the degree of computer implementation may vary, as may be desirable and/or beneficial for one or more particular applications.

In some embodiments, one or more computer-readable storage media is provided containing computer readable instructions embodied thereon that, when executed by one or more computing devices (contained in or associated with the one or more components set forth above), cause the one or more computing devices to perform one or more steps of the methods described herein, such as one or more actions described in association with the blocks of FIGS. 1b, 2b, and/or 3b. In other embodiments, one or more of these method steps can be implemented in digital and/or analog circuitry or the like.

It should now be appreciated that some embodiments of the present disclosure, or portions thereof, have been described in the general context of computer code or machine-useable instructions, including computer-executable instructions such as program modules, etc., being executed by a computing system, or other machine or machines. Some of these embodiments or others may be implemented using a variety of system configurations, including handheld devices, consumer electronics, general-purpose computers, more specialty computing devices, etc. Embodiments described herein may also be implemented in distributed computing environments, using remote-processing devices that are linked through a communications network or the Internet.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A method for direction finding of at least one of a stationary transmitter and a moving transmitter, comprising the following steps:
   a) measuring said signals emitted by each of said at least one transmitter at at least two different measurement points;
   b) determining said location of said measurements points at said time of said measurement;
   c) determining said bearings from said measurement points to each of said at least one transmitter;
   d) creating a graphical representation of said bearings;
   e) transferring said graphical representation as said bearings or in addition to said bearings to a pre-trained artificial neural network; and
   f) estimating said locations of said at least one transmitter by said artificial neural network.

2. The method according to claim 1, wherein pre-training of said artificial neural network is performed using a test data set, wherein said test data set comprises sets of at least one of bearings and graphical representations of bearings and information about said correct location of said at least one transmitter for each set of bearings or graphical representation.

3. The method according to claim 1, wherein said locations of said measurement points are determined at least one of relative to each other and absolute.

4. The method according to claim 1, wherein said locations of said measurement points are determined using a receiver for a satellite based location system.

5. The method according to claim 1, wherein said locations of said at least one transmitter are estimated at least one of relative to each of said measurement points and absolute.

6. The method according to claim 1, wherein said bearings are determined using at least one of said direction of signals at said measurement points and said locations of said measurement points.

7. The method according to claim 1, wherein said bearings are determined in at least one of two and three dimensions.

8. The method according to claim 7, wherein said bearings are determined using an algorithm for calculating bearings.

9. The method according to claim 7, wherein said algorithm for calculating bearings is based on at least one of said super resolution technique, said Watson-Watt technique and said running-fix technique.

10. The method according to claim 1, wherein said signals are measured using at least two stationary antennas located at at least one of said measurement points and at least one movable antenna.

11. The method according to claim 1, wherein said artificial neural network is a convolutional neural network, a recurrent neural network, a capsule neural network or any combination thereof.

12. The method according to claim 1, wherein at least said step a) is repeated again at another point in time, wherein at least one of a track covered by one or more of said antennas is determined and a track covered by one or more of said at least one transmitter is estimated.

13. The method according to claim 1, wherein said operator is provided with at least one of said bearings, said graphical representation of said bearings, said estimated locations of said at least one transmitter and a map including at least one of said estimated location of said at least one transmitter, said locations of said measurement points, geospatial data, said graphical representation of said bearings, said track covered by one or more of said antennas and said track covered by one or more of said at least one transmitter.

14. A system for direction finding of at least one of a stationary transmitter and a moving transmitter comprising:
at least one of at least two stationary direction finding units with an antenna each and at least one movable direction finding unit with an antenna;
a bearing module configured for determining said bearings from said antenna to each of said at least one transmitter; and
a pre-trained artificial neural network configured for estimating said locations of said at least one transmitter based on said determined bearings,
wherein said system is configured to:
a) measure said signals emitted by each of said at least one transmitter at at least two different measurement points;
b) determine said location of said measurements points at said time of said measurement;
c) determine said bearings from said measurement points to each of said at least one transmitter;
d) create a graphical representation of said bearings;
e) transfer said graphical representation as said bearings or in addition to said bearings to a pre-trained artificial neural network; and
f) estimate said locations of said at least one transmitter by said artificial neural network.

15. The system according to claim 14, wherein said system comprises a control unit having at least one of said artificial neural network and said bearing module.

16. The system according to claim 14, wherein said system comprises a display unit for providing said operator with at least one of said bearings, a graphical representation of said bearings, said estimated locations of said at least one transmitter and a map including at least one of said estimated location of said at least one transmitter, said locations of said measurement points, geospatial data, said graphical representation of said bearings, said track covered by one or more of said antennas and said track covered by one or more of said at least one transmitter.

17. The system according to claim 14, wherein said artificial neural network is a convolutional neural network, a recurrent neural network, a capsule neural network or any combination thereof.

18. The system according to claim 14, wherein the pre-training artificial neural network is pre-trained with a test data set, wherein said test data set comprises sets of at least one of bearings and graphical representations of bearings and information about said correct location of said at least one transmitter for each set of bearings or graphical representation.

19. The system according to claim 14, wherein said signals are measured using at least two stationary antennas located at at least one of said measurement points and at least one movable antenna.

20. The system according to claim 14, wherein said bearings are determined using at least one of said direction of signals at said measurement points and said locations of said measurement points.

* * * * *